(12) United States Patent
Petelenz et al.

(10) Patent No.: US 8,191,421 B2
(45) Date of Patent: *Jun. 5, 2012

(54) DIGITAL BALLISTIC IMPACT DETECTION SYSTEM

(75) Inventors: Tomasz J. Petelenz, Salt Lake City, UT (US); Stephen C. Jacobsen, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/266,144

(22) Filed: Nov. 6, 2008

(65) Prior Publication Data

US 2010/0326192 A1 Dec. 30, 2010

Related U.S. Application Data

(63) Continuation-in-part of application No. 12/116,605, filed on May 7, 2008.

(60) Provisional application No. 60/928,147, filed on May 7, 2007.

(51) Int. Cl.
*G01H 1/00* (2006.01)
(52) U.S. Cl. .......................................... 73/579; 73/11.01
(58) Field of Classification Search ........................ None
See application file for complete search history.

(56) References Cited

U.S. PATENT DOCUMENTS

| 4,507,705 | A | * | 3/1985 | Hoshino et al. ............ 361/283.1 |
| 5,001,933 | A | | 3/1991 | Brand |
| 5,151,763 | A | | 9/1992 | Marek et al. |
| 5,390,367 | A | | 2/1995 | Rush, III |
| 5,539,935 | A | | 7/1996 | Rush, III |
| 5,874,675 | A | | 2/1999 | Edmans et al. |
| 5,916,181 | A | | 6/1999 | Socci et al. |
| 5,948,981 | A | | 9/1999 | Woodruff |
| 5,978,972 | A | | 11/1999 | Stewart et al. |
| 6,031,317 | A | | 2/2000 | Chen |
| 6,301,718 | B1 | | 10/2001 | Rigal |
| 6,327,909 | B1 | | 12/2001 | Hung et al. |
| 6,549,872 | B2 | | 4/2003 | Bollweg et al. |
| 6,619,123 | B2 | | 9/2003 | Gianchandani et al. |
| 6,737,979 | B1 | | 5/2004 | Smith et al. |

(Continued)

FOREIGN PATENT DOCUMENTS

DE 3703946 8/1988

(Continued)

OTHER PUBLICATIONS

U.S. Appl. No. 12/116,605, filed May 7, 2008; Stephen C. Jacobsen; office action mailed Nov. 15, 2010.

(Continued)

*Primary Examiner* — Hezron E Williams
*Assistant Examiner* — Mark A. Shabman
(74) *Attorney, Agent, or Firm* — Thorpe North & Western LLP

(57) ABSTRACT

Methods and devices for a miniature, ultra-low power impact recorder for detecting, quantifying and recording the energy of an explosive blast or ballistic projectile impact. In one embodiment, the impact recorder can included a sensor comprised of an array of electromechanical resonators that is sensitive to the vibrations produced in selected, discrete frequency ranges that approximate the spectral signature characteristics of the shockwave resulting from the ballistic impact event, even after traveling through impacted material or body tissues.

30 Claims, 4 Drawing Sheets

U.S. PATENT DOCUMENTS

| | | |
|---|---|---|
| 6,826,509 B2 | 11/2004 | Crisco, III et al. |
| 6,858,970 B2 | 2/2005 | Malkin et al. |
| 7,032,454 B2 | 4/2006 | Amano |
| 7,162,392 B2 | 1/2007 | Vock et al. |
| 7,253,488 B2 | 8/2007 | Zhan et al. |
| 7,266,988 B2 | 9/2007 | Kranz et al. |
| 7,290,437 B1 | 11/2007 | Tanaka et al. |
| 2002/0070635 A1* | 6/2002 | Morrison et al. ............ 310/311 |
| 2003/0197448 A1 | 10/2003 | Tanielian |
| 2005/0177929 A1 | 8/2005 | Greenwald et al. |
| 2006/0038694 A1 | 2/2006 | Naunheim et al. |
| 2006/0074338 A1 | 4/2006 | Greenwald et al. |
| 2007/0056081 A1 | 3/2007 | Aspray |
| 2007/0089480 A1* | 4/2007 | Beck ........................... 73/12.01 |
| 2007/0169553 A1 | 7/2007 | Mutharasan et al. |
| 2008/0083054 A1 | 4/2008 | Vaccari et al. |

FOREIGN PATENT DOCUMENTS

| | | | |
|---|---|---|---|
| WO | WO2005/034666 | | 4/2005 |
| WO | WO 2006/085935 | * | 8/2006 |
| WO | WO2006/085935 | | 8/2006 |

OTHER PUBLICATIONS

Miles, Donna, "New Helmet Sensors to Measure Blast Impact," American Forces Press Service, Jan. 7, 2008, 5 pages.

Buxbaum, "Government Healthit" "Pentagon testing helmet-mounted trauma sensor," Published Apr. 10, 2008, www.govhealthit.com/online/news/350303-1.html, 2 pages.

www.ohsonline.com/articles/57407, Emergency Response, "Helmet Sensors of Deployed Soldiers to Measure Impact Data," Jan. 15, 2008, 2 pages.

www.shok-spotr.com/index.asp, "Shok SpotR, The First Helmet Sensor," accessed Jul. 29, 2008, 2 pages.

www.riddell1.com/newsite/product_info.php?cPath=104_76_. . . , Riddle Product Detail, accessed Jul. 29, 2008, 1 page.

www.smalltimes.com/articles/article_display.cfm?Section=A, Small Times—Small tech tackles concussion syndrome with MEMS . . . , Jan. 13, 2004, 5 pages.

IU Home Pages: Jan. 26, 2007—Faculty and staff news from the campuses of Indiana University, IU Home pages, "Football's a head game," Jan. 26, 2007, 4 pages.

Greenwald, Richard et al., "Head Impact Telemetry System (HITS) for Measurement of Head Acceleration in the field," no date is available but this piece should be considered as prior art for this matter.

Petelenz, Tomasz et al., U.S. Appl. No. 12/116,605, filed May 7, 2008.

* cited by examiner

DIGITAL BALLISTIC IMPACT DETECTION SYSTEM

RELATED APPLICATIONS

This application is a continuation-in-part of U.S. patent application Ser. No. 12/116,605, filed May 7, 2008, and entitled "Digital Wound Detection System", which claims the benefit of U.S. Provisional Application Ser. No. 60/928,147, filed May 7, 2007, and entitled, "Digital Wound Detection System", which are incorporated by reference in their entirety herein.

FIELD OF THE INVENTION

The present invention relates generally to methods and devices related to digital ballistic impact detection.

BACKGROUND OF THE INVENTION AND RELATED ART

In the modern, automated battlefield, innovations and advancements have abounded in the areas of remote surveillance, weapons systems delivery and accuracy, communications, personal protection of soldiers, etc. One area which has lagged behind is the diagnosis and treatment of wounded soldiers, which still requires trained medical personnel to accurately diagnose the severity of injuries suffered in the battlefield and to conduct triage in prioritizing accurate and effective treatment, often on an unconscious soldier who cannot answer questions.

One particularly difficult injury to diagnose is Traumatic Brain Injury (TBI), which relies on an accurate determination of the magnitude of the impact or blast energy to the head of the individual. In the civilian sector the severity of the injury can often be correctly determined after-the-fact at a local hospital with an x-ray, MRI or CAT scan which provides an internal image of the resulting damage. Unfortunately, these heavy and bulky devices are not generally available near battlefields, and it could be hours or even days before the wounded combat soldier can be taken to similar assessment facilities. If left undetected, however, asymptomatic TBI could result in delayed neurological damage due to swelling of the brain, etc. which could be prevented with earlier treatment. What is needed, therefore, is a method and system for (1) accurately measuring and recording the severity of the impact or blast energy experienced by the soldier, (2) for accessing the data in the battlefield environment for improved diagnostics and selection of treatment, and (3) for performing these functions with minimal power expenditure, as any device mounted on the helmet which requires frequent battery changes may be impractical under battlefield conditions.

SUMMARY OF THE INVENTION

In light of the problems and deficiencies inherent in the prior art, the present invention seeks to overcome these by providing a method for estimating a magnitude of a ballistic impact. The method includes providing an impact recorder having a self-powered shock sensor that is configured to generate an electric signal which is proportional to the shock value of the ballistic impact event. The impact recorder is further configured to transport the electric signal to a latchable memory device, such as an electronic fuse, a magnetic-based memory device or a similar device, which captures and stores the maximum shock value of the ballistic impact event for later retrieval. The method also includes retrieving the captured maximum shock value, possibly with a portable data collector or readout device, and utilizing the captured shock information to determine the magnitude of the ballistic impact. The captured data may also include information about the timing of the ballistic event, or the time elapsed from the ballistic impact to the readout of the sensor information by the rescuer.

The present invention can also comprise an impact recorder which measures the severity of a ballistic impact experienced by a combat soldier. The impact recorder can be comprised of several components, including a self-powered shock sensor or array of electromechanical resonators that is configured for resonant vibration in a range of frequencies corresponding to the range of frequencies excited by the ballistic impact, which resonant vibration is used to self-generate an electric signal that is proportional to a magnitude of the ballistic impact. The impact recorder can also include an electronic circuit that is configured to carry the electric signal away from the shock sensor, and a latchable electronic memory configured to capture and store the maximum value of the electric signal proportional to the shock value of the ballistic impact.

The present invention can also comprise an impact recorder configured to measure the severity of any impact event, having at its core a self-powered shock sensor comprised of an array of piezoelectric cantilever or microcantilever beams. The array of piezoelectric cantilever beams can be tuned for resonant vibration in the range of frequencies corresponding to the range of frequencies excited by the impact event, and through the resonant vibration self-generate an electric signal that is proportional to the shock value of the impact event. The impact recorder can also include an electronic circuit that is configured to carry the electric signal away from the shock sensor, and a latchable electronic memory constructed to capture and store the maximum value of the electric signal generated by the array of piezoelectric cantilever beams.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which.

DETAILED DESCRIPTION OF EXEMPLARY EMBODIMENTS

The following detailed description of the invention makes reference to the accompanying drawings, which form a part thereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the exemplary embodiments of the present invention is not intended to limit the scope of the invention as it is claimed, but is presented for purposes of illustration only: to describe the features and characteristics of the present invention, and to sufficiently enable one skilled in the art to practice the invention. Accordingly, the scope of the present invention is to be defined solely by the appended claims.

The exemplary embodiments of the digital ballistic impact detection system of the present invention set forth in the detailed description will be best understood by reference to the accompanying drawings, wherein the elements and features of the invention are designated by numerals throughout.

Figure 1:
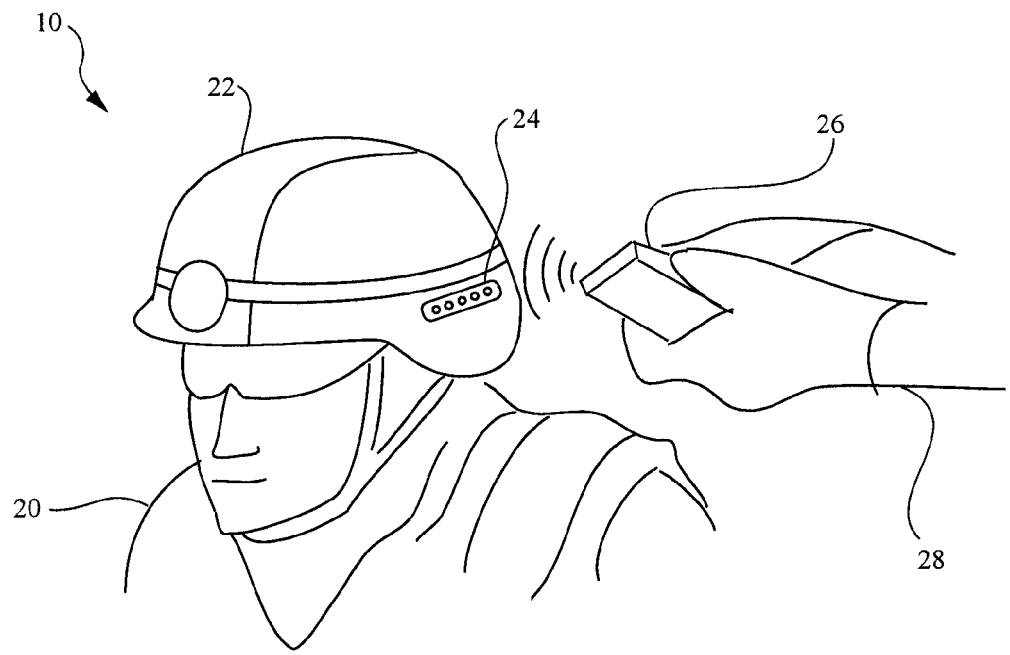
FIG. 1 is a schematic drawing of the application of the digital ballistic impact detection system in a battlefield environment, according to an exemplary embodiment of the present invention.

Illustrated in FIG. 1 is a schematic drawing of an exemplary embodiment 10 of the digital ballistic impact detection system as applied in a battlefield environment. For example, the system can be mounted on a soldier's helmet and the results can be read out using a wireless reader. The detection system of the present invention can comprise, among other things, a zero-power or ultra-low power impact recorder capable of detecting, quantifying, recording and transmitting the maximum energy of a blast or impact to the head for aiding in the triage and diagnosis of Traumatic Brain Injury (TBI) in soldiers on the battlefield.

The embodiment 10 of the present invention can include a combat soldier 20 wearing a helmet 22, to which is attached an impact recorder 24 that can detect, quantify, and record the maximum value or absolute magnitude of a shock experienced by the head of the soldier, in response to the impact of a projectile or a shock wave from a nearby explosion. As can be appreciated, multiple impact recorders can be worn on the outside of the helmet, on the inside webbing, or on a headband or covering placed in direct contact with the head of the soldier. In other aspects of the invention, the impact recorders can also be integrated into the armor or sewn into the garments worn by the soldier to record the severity of injuries caused by blows or ballistic impacts to other parts of the body.

For the purposes of the following description, the terms "ballistic impact(s)" and "ballistic impact event(s)" refer to impacts caused by both high-velocity 'ballistic' projectiles and shock waves from landmines, IEDs, grenades or other nearby explosions, as opposed to non-event shocks, jolts or impacts resulting from normal soldiering activities such as running, jumping, dropping to the ground and firing a weapon.

After suffering an injury cased by the ballistic impact, the wounded soldier may be unconscious or otherwise unable to accurately communicate the extent of his injuries to medical personnel. With the present invention the medic 28 can used a readout device to 26 to view the maximum shock values captured by the recorder(s) 24 and assess the likelihood of TBI or other internal injuries not visible to the naked eye. With this information in hand, the medic can then perform triage and initiate an early treatment more suited to the specific injuries suffered by the soldier, and possibly prevent the onset of delayed neurological damage resulting from head trauma that could otherwise go undetected.

The digital ballistic impact detection system of the present invention provides several significant advantages over prior related automated diagnostic systems, some of which are recited here and throughout the following more detailed description. First, the present invention overcomes a number of obstacles that have hindered the application of impact recorders to the medical diagnosis and treatment of injured combat soldiers, some of which are related to the accurate measurement of shock events.

Shock or impact events can be generalized as random or non-repeating, high magnitude, short duration events for which data capture has historically been problematic. Detecting randomly-occurring and fast, short duration events normally requires a continuous, high rate data acquisition system coupled to a high-speed electronic data processing and analysis device to determine the characteristic sensor signals patterns associated with such events. The electronics and computer resources needed for such tasks are power-intensive and thus impractical for wearable and/or remotely-operated devices that need to operate without externally-supplied electrical power or battery changes for extended periods.

The present invention overcomes these obstacles by providing an efficient, highly reliable impact recorder with an event-specific trigger that does not require external power to detect and record the magnitude of the impact event. Eliminating the complex data collection and processing to minimize the power requirement, and utilizing electric power only upon the detection of an adverse event enables the impact recorder to be used as personnel or telemetric surveillance of randomly-occurring ballistic impacts. The impact recorder of the present invention could also be applied to other military- and civilian-based applications, such as remote detection and characterization of vehicular traffic across bridges and roads, vehicle accident data recorders, cargo container impact monitoring, and the like.

The impact recorder of the present invention derives its capabilities from a self-powered shock sensor which includes a tunable array of electromechanical resonators which have been configured for resonant vibration in the range of frequencies corresponding to the range of frequencies excited by the ballistic impact. It has been determined that ballistic impact events can produce a distinct frequency impact signature, even as it travels through impacted material or body tissue. Limiting the excitation and resulting resonant vibration of the electromechanical resonators to only those impact events which are of most interest combines the detection and filtering functions of the unwieldy, prior art electronic systems into one electromechanical sensing device, and leads to accurate measurement without processing. Accordingly, the need to electronically capture, process and analyze all impacts experienced by the soldier and filter out those non-ballistic impact events resulting from normal soldiering activities, such as running, jumping, dropping to the ground or firing a weapon, is eliminated.

The individual electromechanical resonators can also be provided with a piezoelectric layer, sensor or covering that conforms to the surface of the resonators and produces an electric signal proportional to the degree of bending experienced by the vibrating structures. If properly configured as described above, the array of electro-mechanical resonators will only produce an electric signal in response to ballistic impact events, and not to non-events. As this electric signal is generated simply by the flexing of the piezoelectric layers, no external power source for the sensor is required. Consequently, the tunable shock sensor of the present invention successfully removes the requirements for an external power source created by a powered sensor, as well as the high-speed signal digitization and digital signal processing (DSP) that are characteristic of prior art electronic data acquisition and analysis systems that capture and process impact events of very short duration.

The shock sensor can be coupled to a variety of latchable, electronic memory devices that can capture and retain the maximum value or magnitude of the electric signal produced by the array of electromechanical resonators. Additionally, an electronic timer, triggered by the ballistic impact sensor response, can also be included to estimate the time elapsed from impact and/or the duration of impact.

The latchable memory devices can be configured to function without an external power source, and operate solely on the electric signal generated by the shock sensor. Alternatively, an internal power source (such as a battery) can be triggered by the sensor's output signal to provide additional energy to transfer the captured impact information into memory, or to transmit the information to a receiver held by a medic. In another aspect of the invention, the electronic memory devices can also be configured to provide a simple visual display of the captured shock value, as well as equipped with a passive RFID tag or similar device that gathers sufficient power from an incoming radio frequency signal generated by the data collector 26 to transmit a response that conveys the recorded information.

With the elimination of the external power source and the small size of the shock sensor, the impact recorder of the present invention can be small and light-weight enough to allow for integration and mounting with an adhesive strip to a rigid object such as a helmet or item of body armor. It can also in sewn into clothing, equipment harnesses or other fabric gear worn by the soldier. With its small size, multiple shock recorders can be mounted over the body and head of the soldier for measurement in three dimensions. Advanced systems can further include integration between sensors to provide a triangulation feature which identifies the impact location of the ballistic impact event as well as its magnitude. Moreover, an algorithm that factors the magnitude of the ballistic impact event and its location on the human body can be used to provide a remote estimate of the severity of the injury.

In addition, an electronic timer can be included that is triggered by the ballistic impact sensor response in order to estimate: (1) the time elapsed from impact, and (2) the duration of impact.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Figure 2:
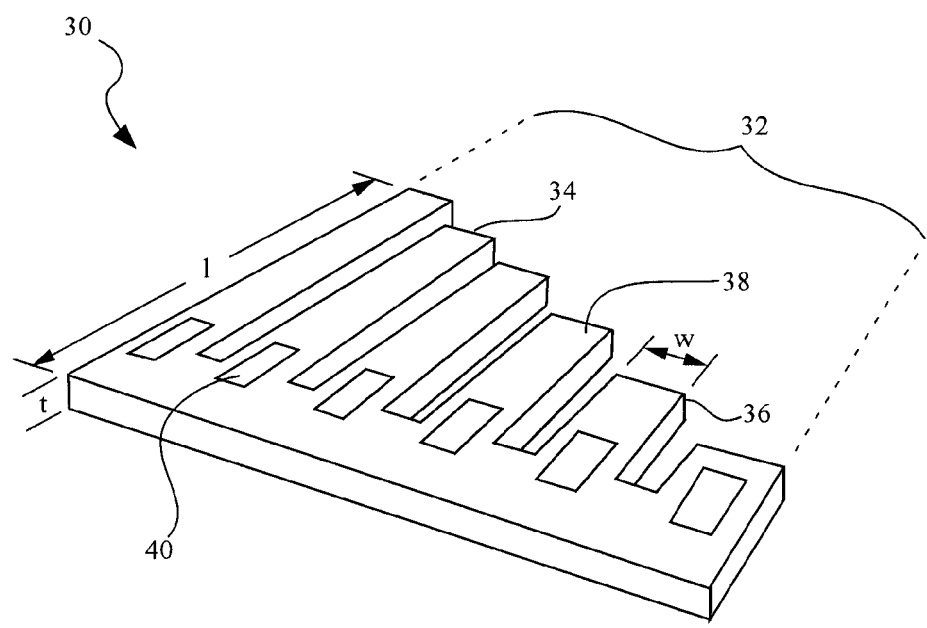
FIG. 2 illustrates a perspective view of self-powered shock sensor, according to an exemplary embodiment of the present invention.

With reference to FIG. 2, illustrated is a perspective view of a self-powered shock sensor 30 that can comprise an array 32 of electromechanical resonators 34 that has been configured, or tuned, with natural frequencies which correspond to the range of frequencies excited by a ballistic impact to the head or body of the soldier. The individual electromechanical resonators can be formed from small or microcantilever beams 36 made from a rigid material having a pre-determined density ($\rho$) and Young's Modulus of Elasticity (E), as well as a pre-determined length (l), width (w) and thickness (t). Through appropriate selection of the rigid material and dimension, the cantilever beam can be 'tuned' with a particular natural frequency $f_n$ according to the following formulas:

$$f_n = \frac{k_n}{2\pi}\sqrt{\frac{EIg}{\omega l^4}},$$

where $$I = \frac{wt^3}{12} \text{ and } \omega = \frac{\rho l w t g}{1}.$$

As can been seen, the cantilever beam 36 tuned to the lowest natural frequency will have the longest length, assuming a constant thickness and width of each beam in the array 32. It is to be appreciated, however, that all three dimensions of the cantilever beam 36, as well as its material properties, can be adjusted when tuning the beam to a specific natural frequency. The array 32 of cantilever beams 36, in which the beam with the lowest natural frequency has the longest length, while the beam with the highest natural frequency has the shortest length, can also be organized in an ascending or descending manner. In the embodiment 30 illustrated in FIG. 2, for example, the individual resonators 34 can be configured, from left to right, in ascending order of natural frequency and descending order of cantilever beam length. However, irregular combinations of beam shapes and sizes can also be appropriate for a specific application and are considered to fall within the scope of the present invention.

The array 32 of cantilever beams 36 can be configured with a piezoelectric sensor 40 attached to or integrated within the top surface 38, the bottom surface, or both the top and bottom surfaces of the beam. The piezoelectric sensor can comprise a piezoelectric material sandwiched between two electrode layers, wherein the electrode layers can be platinum and the piezoelectric material can be PZT, BaTiO3, ZnO, MN or PbNiNbO, etc. Other similar or compatible materials for the electrodes and piezoelectric material can also be considered to fall within the scope of the present invention.

Flexing of the cantilever beam, and therefore the simultaneous flexing of the piezoelectric sensor, causes an electric charge to be produced in the piezoelectric material which is captured and carried away by the electrodes. Thus, the cantilever beam 36 configured with a piezoelectric sensor 40 can together form an electromechanical resonator 34 which produces an electric charge proportional to the magnitude of the bending of the cantilever beam 36 which occurs during vibration. For non-resonant vibration the amount of produced charge can be small and transient, but for resonant vibration the electrical charge can be strong and measurable, and lasting until the resonant vibration dies out or is dampened to zero. As no batteries or external source of power are needed to generate this signal, the array of piezoelectric cantilever beam sensors can be self-powered, i.e. can generate an electrical charge that can be used to activate and power the measuring and recording circuitry.

It is to be appreciated that a shock sensor 30 comprised of an array 32 of electromechanical resonators 34 can be sensitive to a shock wave only in one direction, such as perpendicular to the plane of the array. While this limitation can require the combination of signals from multiple sensors aligned along traversing axis to accurately measure a ballistic impact event, the information provided by each sensor group necessarily includes both the magnitude and direction of the impact. In an advanced embodiment, this information can be used to provide a triangulation feature which identifies the impact location of the ballistic impact event as well as its magnitude. An algorithm that uses the location and magnitude of the ballistic impact can also be used to remotely estimate the severity of the injury. Other beam shapes, such as a beam with a round or square cross-section, can be contemplated so that the sensor responds to impacts in 2-dimensions, in which case fewer sensors may be required for triangulation of impact site location and the determination of the direction of impact force.

Figure 3A:
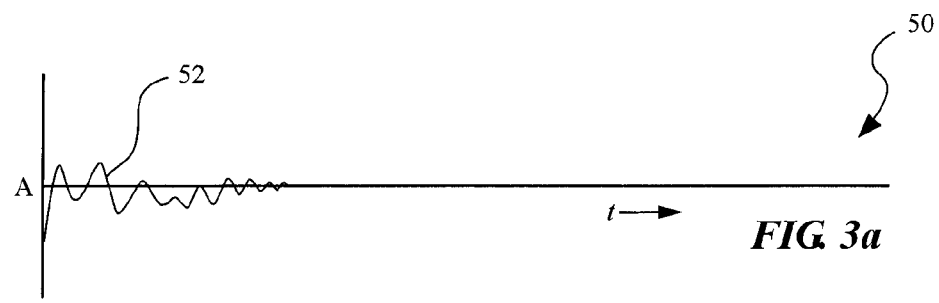
FIGS. 3a, 3b and 3c illustrate the time waveforms and the resulting spectral FFT of an exemplary ballistic impact event and non-ballistic impact event.
Figure 3B:
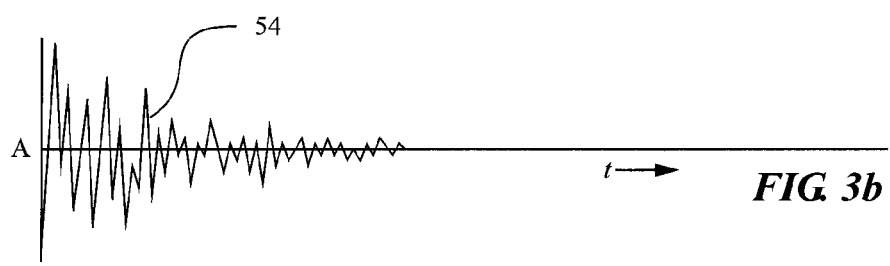

Turning now to the nature of the excitation produced by a ballistic impact, illustrated in FIGS. 3a and 3b are exemplary time waveforms depicting a shock wave produced by a non-ballistic impact event 52 and a ballistic impact event 54, after traveling through the body or head of the soldier, and as received at the location of the impact recorder of the present invention. Each y-axis can identify the amplitude (A) of the shock impact with a range up to plus/minus 50 g's, and the x-axis can indicate the passage of time (t), which for a short duration impact events can be a short as 50 ms to 10 ms, or less. It can be appreciated when comparing the two time waveform plots that the ballistic impact event can have a greater overall strength and additional high frequency components than the non-ballistic impact event.

The raw time waveforms can be analog signals provided by a vibration sensor such as an accelerometer. If the analog signals were to be digitized and processed with DSP electronics and techniques, the resulting frequency spectrum, obtained by FFT (Fast Fourier Transform) of the two impact events can be overlaid in FIG. 3c in which the y-axis identified the amplitude (A) of the vibration and the x-axis displays the frequency (f). For a ballistic impact event, the range of the y-axis can reach as high as 50 g's, and the range of the x-axis can be 0 Hz to 25 khz.

Figure 3C:
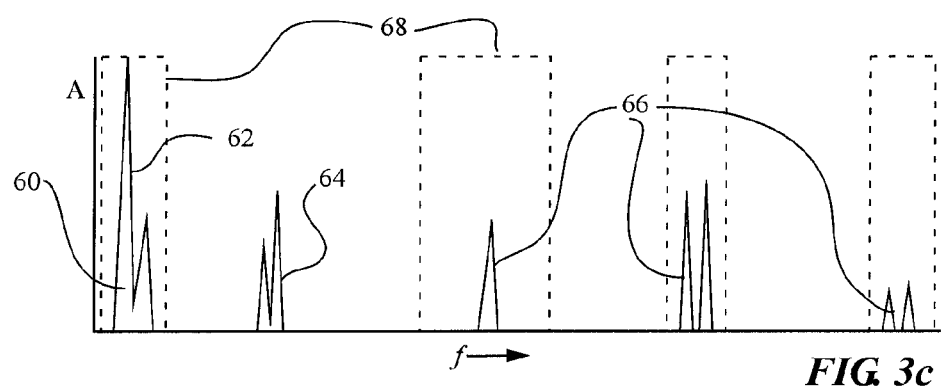

Illustrated in FIG. 3c are the various frequency components 60 present in the two time waveforms, including a low frequency component 62 common to both events, a mid-range component 64 only present in the non-ballistic impact event 52, and a number of higher-frequency components 66 only present in the ballistic impact event 54. Using the unique spectral characteristics of the ballistic impact event to differentiate between an injurious impact or explosion and a non-injurious jolt, bump or shock allows for the creation of a viable shock recorder that can automatically filter out false-positive signals generated by the non-ballistic impact event 52. This can be done by tuning the array of electromechanical resonators described hereinabove with a range of natural frequencies corresponding only to the spectral signature 68 of the ballistic impact event 54.

Figure 4:
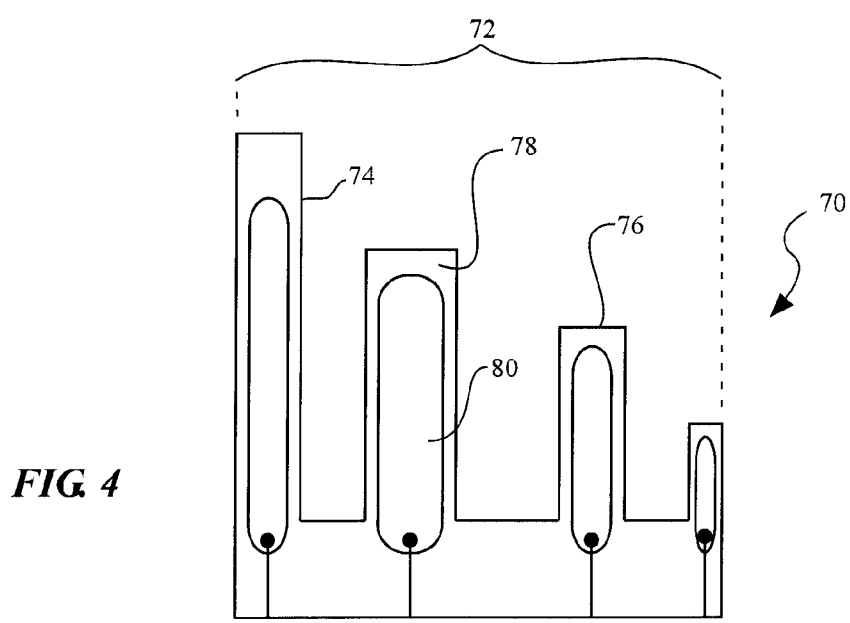
FIG. 4 illustrates a top view of a shock sensor tailored to respond to the vibrational characteristics the ballistic impact event of FIG. 3, according to an exemplary embodiment of the present invention.

A top view of a shock sensor 70 tailored to respond to the vibrational characteristics of the ballistic impact event of FIG. 3c is shown in FIG. 4. This exemplary embodiment of the present invention can comprise an array 72 of four electromechanical resonators 74, each of which further comprises a piezoelectric sensor 80 coupled to a cantilever beam 76 having a natural frequency tuned to one of the frequency components identified in FIG. 3c. The length, width, thickness and spacing of the cantilever beams 76 can be individually adjusted to ensure that the cantilever beams not only have a resonant natural frequency that aligns with a frequency component of spectral impact signature, but that also cover a particular bandwidth surrounding that frequency component. For instance, the bandwidth covered by an electromechanical resonator 74 can be 1 kHz, 2 kHz, or 4 kHz, depending upon the length, width, thickness and material properties of the individual resonator's cantilever beam.

The piezoelectric sensor 80 can also influence the vibrational characteristics of the electromechanical resonator by providing damping effects which can alter the resonant frequency of the cantilever beam 76. Extending the piezoelectric sensor 80 to cover more of the top surface 78 of a cantilever beam, for example, allows for greater control of the damping effects provided by the piezoelectric layer sandwiched between the sensor's electrodes. Such damping can be beneficially applied to dampen out the higher-order vibration modes present in each cantilever beam 76, so that the vibration of the electromechanical resonator 74 can be limited to the first-order bending mode. The piezoelectric sensor 80 can also be configured to generate self-canceling signals at the higher-order modes due to simultaneous bending in both directions.

Using the principles described above, it is one object of the present invention to provide a shock sensor 70 with the individual electromechanical resonators 74 having a maximum sensitivity to a selected frequency range with at least 20 dB rejection of out-of-range frequency stimuli.

Figure 5:
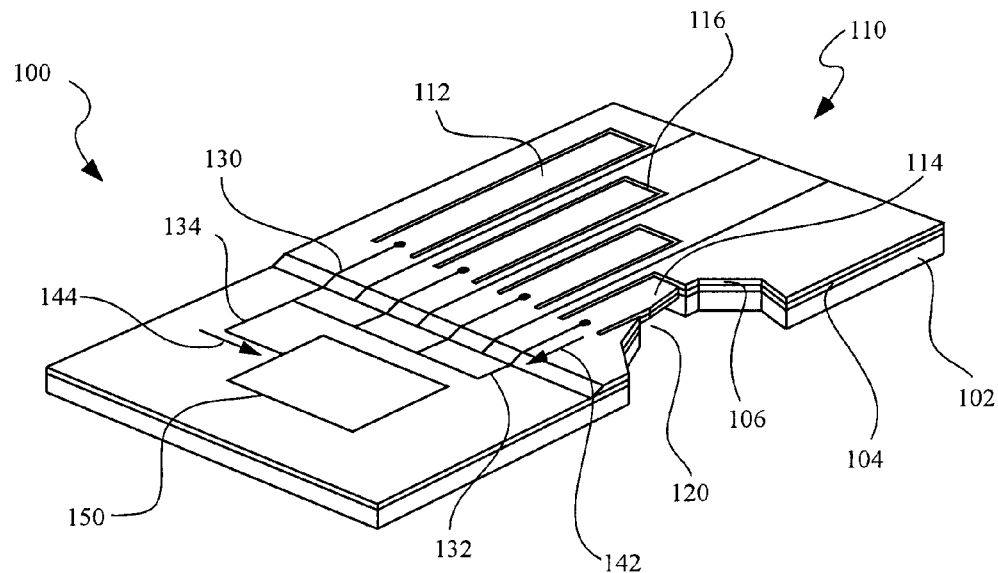
FIG. 5 illustrates a perspective view of the digital ballistic impact detection system, according to an exemplary embodiment of the present invention.

Illustrated in FIG. 5 is a perspective, cut-away view of the digital ballistic impact detection system, according to an exemplary embodiment 100 of the present invention. This embodiment can include a self-powered shock sensor 110 configured to self-generate an electric signal proportional to the shock value of the ballistic impact, an electronic circuit 130 configured to carry the electric signal away from the shock sensor, and a latchable electronic memory 150 that is configured to capture the maximum value of the electric signal proportional to the value of the shock wave amplitude of the ballistic impact.

The shock sensor 110 can be fabricated using a thin-film piezoelectric deposition process and standard semiconductor fabrication techniques to form a thin film piezoelectric microcantilever. As shown in FIG. 5, a silicon wafer 102 can be covered with a plurality of surface layers 104, 106 which, for the purposes of this detailed description, can be representative of a plurality of sub-layers including structural layers 104 formed from silicon nitride and/or silicon dioxide, and piezoelectric sensor layers 106 formed from metal electrodes and a piezoelectric material. VLSI (Very Large Scale Integration) or MEMS (Microelectromechanical Systems) fabrication techniques can be used to deposit and etch a pattern into the upper piezoelectric sensor layers 106 and lower structural layers 104 to form a shock sensor 110 having a plurality of electromechanical resonators 112 or microcantilevers 114 defined by a three-sided perimeter slot 116 that cuts down through both the surface layers 104, 106. A cavity 120 can also be patterned into the backside of the silicon wafer 102 to release the beam structure formed in the surface layers 104, 106 and allow it to vibrate. The microcantilever 114, therefore, can be a combination of piezoelectric sensor layers 106 formed on top of the stiffer, more robust structural layers 104. In an alternative embodiment, the microcantilever can be formed only from the layer 106 of the piezoelectric material and deposited electrodes.

As described above, the shock sensor 110 can be comprised of an array of microcantilevers 114 tuned to the spectral signature of selected ballistic impact events, such as those produced by 'ballistic' projectile impacts or shock waves produced by nearby explosions. A portion of the energy contained in these ballistic impacts can be transferred to the microcantilever beams 114, which induces the beams into resonance at their lowest natural frequency, or first-order 'bending' mode. The bending of the microcantilever beams can generate an electrical charge in the piezoelectric material contained in the conforming layer 106, which electrical charge can be captured in the surrounding electrodes and carried away from the shock sensor by the electronic circuit 130. This electrical charge or signal 142 can be proportional to the power density of all the impact energy contained in the narrow spectral band to which the microcantilever beam is tuned.

As further shown in FIG. 5, the electric signal 142 produced by each individual microcantilever beam 114 can be carried away from the shock sensor 110 by an output circuit segment 132, and can be combined with the output circuits from the other beams in an overall output circuit 134. This can result in an overall, or absolute, electric signal 144 that is proportional to the power density of the impact energy detected by all of the electro-mechanical resonators. The magnitude of the overall power density signal 144 carried by the combined circuit 134 can be an accurate indication of the magnitude of the ballistic impact energy received by the soldier, as it is derived from the entire array of electromechanical resonators 112.

Once combined, the absolute or overall power density signal 144 can be transported to a latchable memory device 150. The latchable memory device 150 can comprise any device that captures and retains, for later retrieval, the highest or maximum level of the absolute power density signal. In one embodiment of the present invention, the latchable memory device can be a one-time programmable memory device, such as a fusible link or dielectric breakdown cell. A fusible link can be comprised of a plurality of memory cells with progressively higher capacity fusible links. The accumulated electrical charge contained the overall power density signal 144 can be converted into voltage by a voltage divider, and then directed through the memory cells which are progressively burnt through as the voltage level from the shock sensor 110 increases. Burning through the links causes the memory cells to permanently change state, which change can be read by the external data collector or readout device. A dielectric breakdown cell can function in a similar manner by permanently changing state in response to increasing levels of the electrical charge, rather than the voltage, produced by the shock sensor 110.

In another embodiment the latchable memory device 150 can be erasable and programmable, such as a magnetic bubble memory (MBM) device or a thin film memory cell (TFMC). With an MBM, the accumulated electrical charge can be converted to pulses of electric current, which advances a "magnetization" bubble from one memory location to the next, similar to a shift register. With a TFMC, a resistance change in a thin film sandwich structure is triggered by the piezosensor-generated charge, causing it to retain the information. Both the MBM and TFMC are erasable and programmable, which can be an important consideration when mounting the data recorders to reusable equipment or garments worn by the soldier.

In each of the embodiments of the latchable memory device 150 described above, no additional power supply or battery is required, and the memory devices can be placed in an active state only upon occurrence of a ballistic impact event which generates an electrical charge that exceeds a pre-defined threshold. Furthermore, the memory devices 150 can be fabricated simultaneously with the shock sensor 110 and electronic circuit 130 into one integrated sensor 100 using low-cost, high-volume VLSI manufacturing methods.

Figure 6:
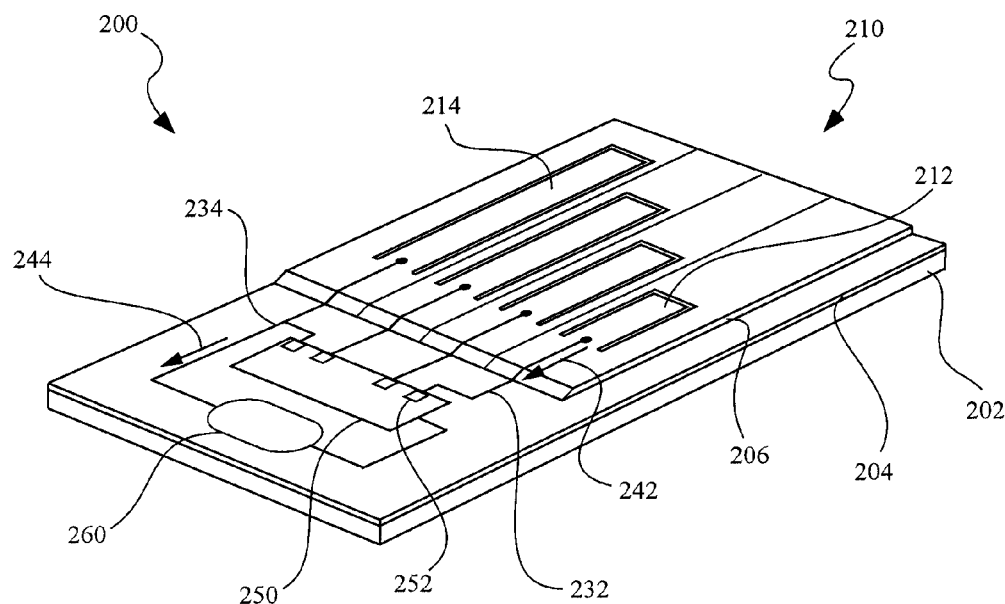
FIG. 6 illustrates a perspective view of the digital ballistic impact detection system, according to another exemplary embodiment of the present invention.

Illustrated in FIG. 6 is an exemplary embodiment 200 of the impact recorder of the present invention which employs an internal power supply, but at levels of power usage far below the levels of prior art systems. In the embodiment 200, the shock sensor 210 can comprises an array of electromechanical resonators or microcantilever beams 212 formed from a composite piezosensor layer 206 and a structural layer 204 that are overlaid upon a silicon substrate 202. Instead of combining the electric outputs 242 from each microcantilever beam 212 in the array into one overall electric signal, as described above, the electric signals from each individual beam can be directed along isolated electronic circuits 132 until reaching the separate input channels 252 of another embodiment of a latchable memory device, such as a microprocessor 250. The microprocessor 250 can be further advantageous by providing additional processing beyond the simple memory devices described above, such as impact signature analysis.

The microprocessor 250 can be powered by an internal battery 260 when needed, while being configured to remain in a state of low-power sleep mode, during most of its operational cycle. When the electric signals 242 generated by the microcantilever beams 212 reach the input channels 252 of the microprocessor, the data can be temporarily stored in sample and hold amplifiers while the microprocessor is triggered to wake up and perform a signature evaluation. The microprocessor 250 can be configured to wake up within 1.0 ms of receiving the electric signals 242 and perform an evaluation of the magnitude of the responses received to determine whether the nature of the exciting impact was a Ballistic Impact Event or a Non-event, through comparison with predetermined signature templates. If the impact is determined to be an Event, the microprocessor can draw power from the battery 260 to rapidly convert each input signal 242 from analog to digital, conduct further DSP and analysis to further define the details of the impact, and to store the resulting data in programmable memory. The stored data can include normalized power density spectrum information from each channel, as well as the overall, absolute shock value of the ballistic impact event. If the impact is determined to be a Non-event, the microprocessor 250 can go back to sleep to conserve energy until the next triggering impact.

The low-frequency microcantilever beam 214 can be sensitized to frequencies in the 0 to 1.0 kHz range, which spectral band contains much of the energy imparted by both Event and Non-event impacts. As a result, the low-frequency microcantilever beam 214 is often vibrating and producing a electric signal 244 while the mid-range and high-frequency electromechanical resonators 212 remain idle. When not being evaluated by the microprocessor, the small amount of scavenged energy contained in the electric signal 244 can directed along electronic circuit 234 to re-charge the battery 260 in preparation for the next evaluation cycle. Consequently, the ultra-low power embodiment 200 of the impact recorder that employs both a microprocessor 250 and an internal power supply such as a battery 260 can continue to operate reliably for extended periods of time without requiring connection to a source of external power.

Figure 7:
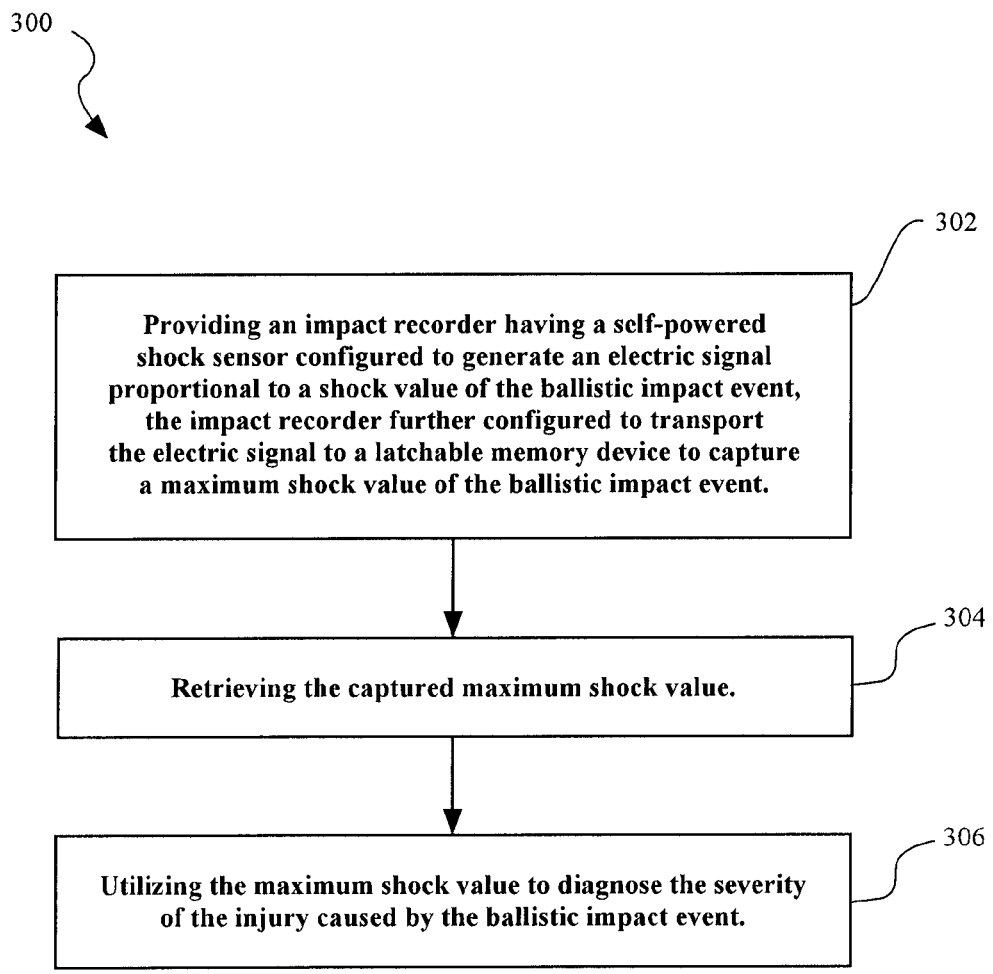
FIG. 7 is a flowchart depicting a method for diagnosing the severity of an injury to a combat soldier caused by a ballistic impact event, according to an exemplary embodiment of the present invention.

Illustrated in FIG. 7 is a flowchart depicting a method 300 for diagnosing the severity of an injury to a combat soldier caused by a ballistic impact event. This method can include the operation of providing 302 to the soldier an impact recorder having a self-powered shock sensor that is configured to generate an electric signal proportional to the shock value of the ballistic impact event. The impact recorder can also be configured to transport the electric signal to a latchable memory device, such as an electronic fuse, a magnetic-based memory device or a microprocessor, and capture a maximum shock value of the ballistic impact event. The method can further include the steps of retrieving 304 the captured maximum shock value from the impact recorder, either visually or with a portable data collector or readout device, and utilizing 306 the maximum shock value to diagnose the severity of the injury caused by the ballistic impact event.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A method for estimating the magnitude of a ballistic impact comprising:
   providing an impact recorder having a self-powered shock sensor powered by a signal from a resonant response to a ballistic impact event, the signal being proportional to a magnitude of the ballistic impact event, the self-powered shock sensor comprising an array of resonators, each resonator in the array being tuned for resonant response within a frequency range corresponding to that generated by the ballistic impact event, the impact recorder further configured to transport the electric signal to a memory device and capture a value of the resonant response;
   retrieving the captured resonant response; and
   utilizing the captured resonant response to determine the magnitude of the ballistic impact.

2. The method of claim 1, further comprising utilizing the magnitude of the ballistic impact to diagnose a severity of an injury caused by the ballistic impact.

3. The method of claim 1, wherein the array of resonators comprises an array of piezoelectric cantilever beams.

4. The method of claim 1, wherein providing an impact recorder further comprises providing a shock sensor tuned to a range of frequencies generated by the ballistic impact of one of a projectile and an explosive blast.

5. The method of claim 1, wherein providing an impact recorder further comprises providing at least two impact recorders orientated along orthogonal axes for measurement of the ballistic impact in three dimensions.

6. The method of claim 5, wherein providing an impact recorder further comprises mounting the at least two impact recorders on a helmet of a user.

7. The method of claim 5, wherein providing an impact recorder further comprises mounting the at least two impact recorders on the body of a user.

8. The method of claim 1, wherein providing an impact recorder further comprises providing at least three impact recorders oriented along three orthogonal axes for measurement of the ballistic impact in three dimensions.

9. The method of claim 8, wherein providing an impact recorder further comprises mounting three impact recorders on a helmet of a user.

10. The method of claim 8, wherein providing an impact recorder further comprises mounting three impact recorders on the body of a user.

11. The method of claim 1, wherein providing an impact recorder further comprises providing a shock sensor configured to generate a power spectrum density of vibrations caused by the ballistic impact.

12. The method of claim 1, wherein providing an impact recorder further comprises providing a latchable memory device selected from the group consisting of a magnetic bubble memory cell, a resistive fusible link, a thin film memory cell and a dielectric breakdown cell.

13. The method of claim 1, wherein providing an impact recorder further comprises providing a microprocessor configurable for hibernation in a low-power sleep state, wherein the signal generated by the shock sensor provides sufficient power to awaken the microprocessor.

14. The method of claim 1, wherein providing an impact recorder further comprises providing a self-powered shock sensor configured for power scavenging.

15. The method of claim 1, wherein retrieving the captured maximum resonant response comprises reading maximum resonant response results with a wireless reader.

16. An impact recorder for measuring the severity of a ballistic impact experienced by a combat soldier comprising:
   a self-powered shock sensor powered by a signal from a resonant response to a ballistic impact event, the signal being proportional to a magnitude of the ballistic impact event, the self-powered shock sensor comprising:
      a plurality of resonators, each resonator being tuned for resonant response within a different frequency range, each of said different frequency ranges being within a frequency range corresponding to that generated by the ballistic impact event;
   an electronic circuit configured to carry the signal away from the shock sensor; and
   an electronic memory configured to capture a value of the signal.

17. The recorder of claim 16, wherein the plurality of resonators further comprises an array of piezoelectric cantilever beams.

18. The recorder of claim 17, wherein a shape of a beam in the array of piezoelectric cantilever beams comprises a round or a rectangular cross-section.

19. The recorder of claim 17, wherein the array of piezoelectric cantilever beams comprise an ascending length.

20. The recorder of claim 16, wherein at least one of the plurality of resonators is configured to resonate within the range of frequencies generated by the ballistic impact of a projectile.

21. The recorder of claim 16, wherein at least one of the plurality of resonators is configured to resonate within the range of frequencies generated by the ballistic impact of an explosive blast.

22. The recorder of claim 16, wherein the signal further comprises a power spectrum density of vibrations caused by the ballistic impact.

23. The recorder of claim 16, wherein the electronic memory is selected from the group consisting of a magnetic bubble memory cell, a resistive fusible link, a thin film memory cell and a dielectric breakdown cell.

24. The recorder of claim 16, wherein the electronic memory is a microprocessor configurable for hibernation in a low-power sleep state, wherein the self-generated signal provides sufficient power to awaken the microprocessor.

25. The recorder of claim 16, wherein at least one of the plurality of resonators is configured for power scavenging.

26. The recorder of claim 16, further comprising an electronic timer to measure a duration of the ballistic impact event.

27. The recorder of claim 16, further comprising an internal power source to provide energy to transmit the maximum value of the signal to an external device.

28. An impact recorder for measuring the severity of an impact event comprising:
  a self-powered shock sensor powered by signals from resonant responses to a ballistic impact event, the signals being proportional to a magnitude of the ballistic impact event within a frequency range of vibrations generated by the impact event, the self-powered shock sensor comprising:
    an array of piezoelectric cantilever beams, each beam being tuned for resonant response within a different frequency range, each of said different frequency ranges being within a frequency range corresponding to that generated by the ballistic impact event;
  an electronic circuit configured to carry the signals away from the shock sensor; and
  an electronic memory configured to capture responses associated with the different frequency ranges conveyed by the signals to determine the severity of the impact event.

29. The recorder of claim 28, wherein the electronic memory further comprises a combination of a microprocessor and a latchable memory device.

30. The recorder of claim 28, further comprising a battery.

* * * * *